March 19, 1940.  W. E. SANFORD  2,193,939
MICROMETER
Filed Feb. 10, 1938   2 Sheets-Sheet 1
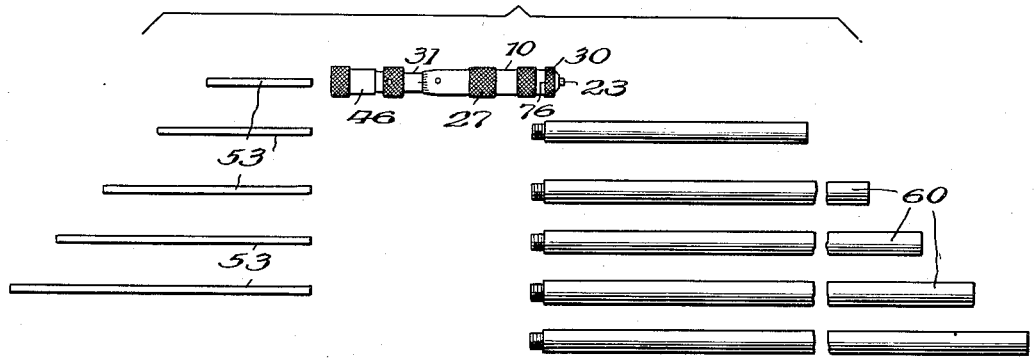
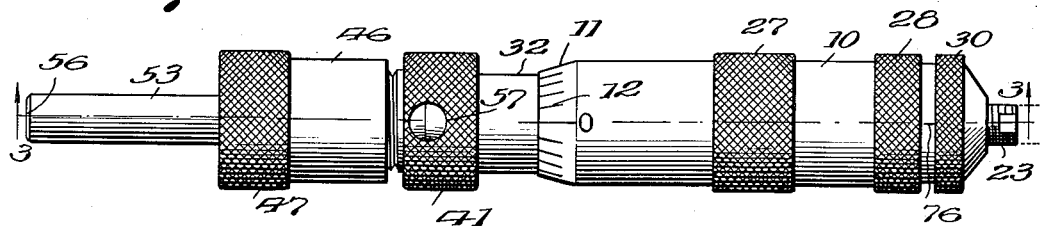
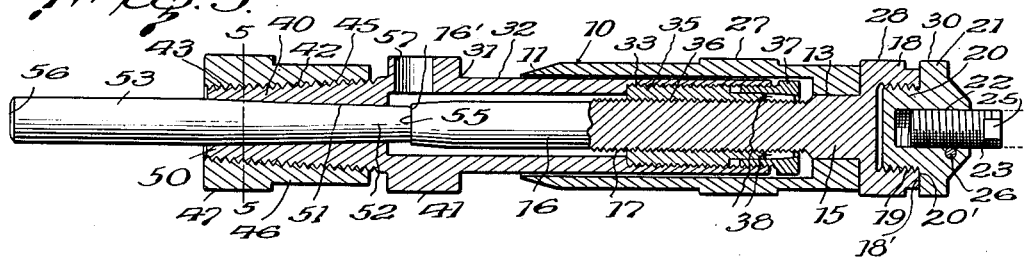
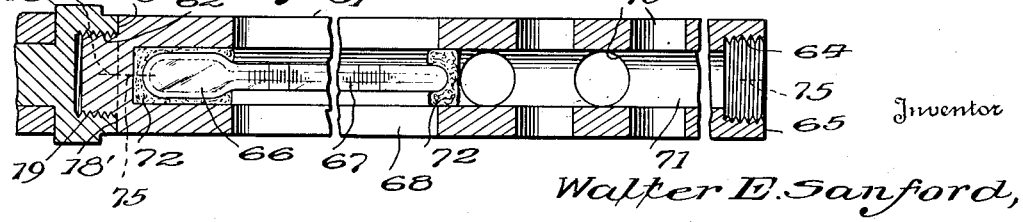
Inventor
Walter E. Sanford,
By John R. Tomlin
Attorney March 19, 1940. W. E. SANFORD 2,193,939
MICROMETER
Filed Feb. 10, 1938 2 Sheets-Sheet 2
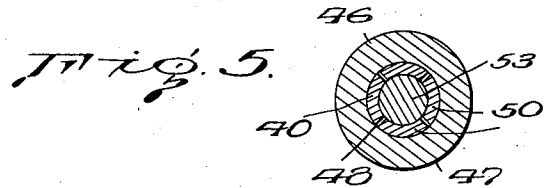
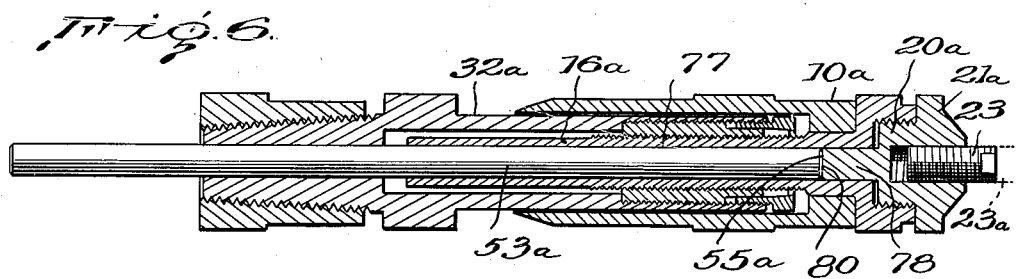
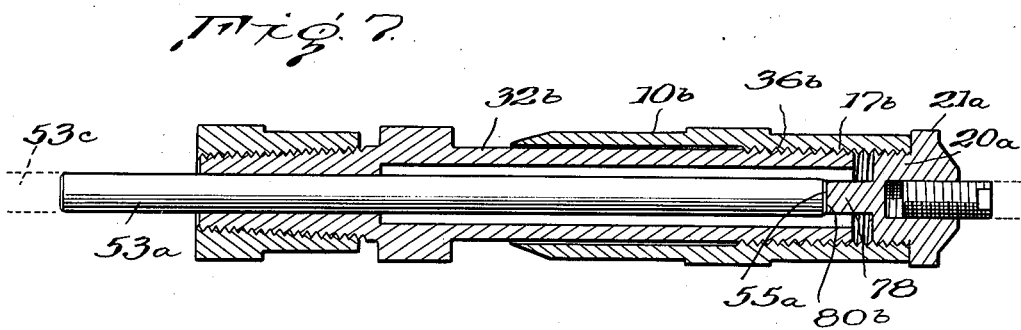
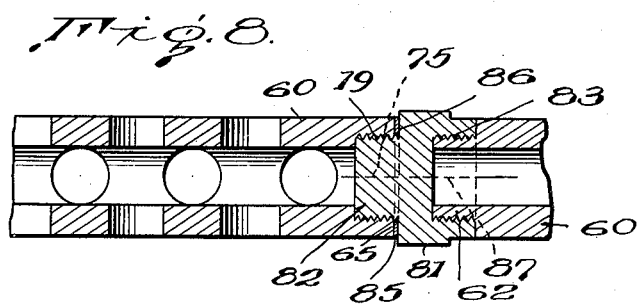

Patented Mar. 19, 1940

2,193,939

UNITED STATES PATENT OFFICE 2,193,939

MICROMETER

Walter E. Sanford, Alexandria, Va.

Application February 10, 1938, Serial No. 189,855

11 Claims. (Cl. 33—164)

This invention relates to micrometers, and more particularly to an improved inside micrometer having related novel components whereby universal dimensional range is provided.

In the use of inside micrometers of conventional commercial construction, where the dimensional range is widely diversified, it is necessary to maintain a number of different micrometer sets, and to employ the set best adapted for the dimensional requirements in connection with a particular job. If a relatively small inside dimension is to be determined, then the ordinary micrometer may be employed, but, in determining inside dimensions of relatively large bodies, separate micrometer sets having special extension components are required, and, inasmuch as the range of inside dimensions in the ordinary shop requirement is greatly diversified, it is frequently necessary for the operator to maintain a number of combinations and to employ a selected combination in connection with a particular job.

An object of this invention is to provide an improved inside micrometer and related extension components whereby universal dimensional range is afforded and assured accuracy provided.

A further object of this invention is to provide an improved inside micrometer set having a micrometer of improved construction with which there is employed gauge rods and related extension members, the gauge rods being progressively increased in length one over the others in dimensional increments that form an aliquot part of the dimensions of the related extension members, so that universal dimensional range may be provided by the employment of the selected gauge rod and extension member with the common micrometer.

A more specific object of this invention is to provide an improved inside micrometer set including a micrometer of improved construction to which one of a plurality of gauge rods and extension members may be rigidly secured in accurate relation, and the lengths of the gauge rods being progressively increased in similar increments, and the extension rods being provided in different lengths with the length dimension of each rod being a multiple of the increment of increase of one gauge rod over the next smaller rod, thereby providing a composite micrometer set having universal dimensional range.

It is also an object of this invention to provide a micrometer of generally improved construction, whereby the device will be simple, durable and inexpensive in construction, as well as convenient, practical, serviceable and efficient in its use.

With the foregoing and other objects in view, which will appear as the description proceeds, the invention resides in the combination and arrangement of parts, and in the details of construction hereinafter described and claimed, it being understood that various changes in form, proportion, and minor details of construction may be made within the scope of the claims without departing from the spirit or sacrificing any advantages of the invention.

For a complete disclosure of the invention a detailed description of it will now be given in connection with the accompanying drawings forming a part of the specification, wherein:

Figure 1 is a composite elevational view depicting my improved micrometer, gauge rods and extension members in disassembled relation, details of the extension members being omitted, Figure 2 is a side elevation of the improved micrometer depicting one of the gauge rods secured thereto, Figure 3 is a longitudinal sectional view taken on the line 3—3 of Figure 2, Figure 4 is a fragmental longitudinal sectional view taken through one of the improved extension members or tubes, and a portion of the micrometer, Figure 5 is a transverse sectional view taken on the line 5—5 of Figure 3, Figure 6 is a longitudinal sectional view taken through a slightly modified form of my invention, Figure 7 is a similar view taken through another modified form of my invention, and Figure 8 is a fragmental longitudinal sectional view taken through one of the improved extension tubes or members depicting a slight modification.

Referring to the drawings, in which similar reference characters designate corresponding parts, there is depicted a cylindrical thimble 10 having a frusto-conical peripheral surface 11 formed at one terminal thereof on which is inscribed the conventional graduations or indices 12 forming components of the usual vernier micrometer scale arrangement. The opposed terminal of the thimble 10 has a reduced bore 13 provided therein which accurately engages an enlarged cylindrical portion 15 of a screw 16 which is provided with the usual conventional fine micrometer threads 17. The surface of the bore 13 of the thimble 10 is snugly fitted to the cylindrical surface 15 of the screw 16 so that the thimble, in effect, becomes an integral part of the screw 16. An enlarged cylindrical head 18 is formed at the outer terminal of the screw, and this head is provided with a cylindrical threaded aperture 19 which receives a threaded cylindrical extension 20 of a terminal plug or cap 21. The cap 21 is provided with an accurately located ground annular shoulder 20' which engages an accurately located annular shoulder or surface 18' formed at the outer terminal of the enlarged screw head 18. An axially extending threaded bore 22 is formed in the outer portion of the cap 21 for the reception of an adjusting screw 23 having wrench-engaging surfaces 25 formed in the outer terminal thereof to permit the screw 23 to be adjusted relative to the cap 21 by employing a suitable tool or wrench, not shown, and a lock or set screw 26 is threaded through the cap 21 and engages the peripheral surface of the screw 23 to thereby lock it in predetermined position in the cap 21. When the extension 20 of the cap 21 is threaded into the threaded aperture 19 of the screw head 18, and the thimble 10 positioned on the cylindrical surface 15 of the screw 16, the thimble 10, screw 16, head 18 and cap 21 become, in effect, an integral or unitary structure which may be readily manipulated by grasping the annular knurled surfaces 27, 28 and 30 formed on the outer peripheral surface of the thimble 10, head 18 and cap 21 respectively.

The micrometer is provided with a cylindrical member or barrel 31, and its outer peripheral surface 32 is rotatably received within the thimble 10. The inner terminal of the barrel 31 is provided with an enlarged threaded cylindrical axial aperture or bore 33 which receives the outer threaded surface of a cylindrical adjusting nut 35. The inner bore of the cylindrical adjusting nut is threaded, as indicated at 36, to operably engage the threads 17 formed on the screw 16, so that movement of the thimble 10 and screw 16 relative to the barrel 31 and nut 35 results in longitudinal movement of the thimble 10 along the barrel 31. In order to maintain some of the threads 36 of the cylindrical nut 35 in accurate fitting relation with the threads 17 of the screw 16, an annular wedge 37 of known construction is interposed between the inner threaded surface of the barrel 31 and the outer surface of a reduced and axially split portion 38 of the adjusting nut 35. This arrangement serves to maintain the threads 36 of the reduced portion of the nut 35 in accurate operable relation with the threads 17 of the screw 16, and inasmuch as such construction is well known and understood by those skilled in the art it is merely depicted here to disclose a commercially operable device. A frusto-conical member 40 extends axially from the outer terminal of the barrel 31, and an enlarged knurled manipulating head 41 is interposed between the extension 40 and the barrel 31 to thus provide a convenient manipulating member for the barrel. The outer or frusto-conical surface of the extension 40 is threaded, as indicated at 42, to engage similar threads 43 formed in the frusto-conical bore 45 of a cylindrical clamping nut 46. The clamping nut 46 is enlarged and preferably knurled at its outer terminal to provide a convenient manipulating head or surface 47. The extension member 40 is provided with longitudinal slits or recesses 48, so that axial movement of the clamping nut 46 relative to the frusto-conical extension 40 causes the resulting fingers 50 of the frusto-conical extension member 40 to engage and clamp a suitable gauge rod in predetermined relation to components of the micrometer, as will be hereinafter disclosed. The frusto-conical extension 40 is provided with a frusto-conical bore 51 to receive the frusto-conical or tapered terminal 52 of one of a plurality of gauge rods 53 which are provided to form extensions of the micrometer. A predetermined and related number of gauge rods 53 are provided, and the inner terminal of each gauge rod 53 is provided with an accurately located terminal surface 55 which is accurately ground to a known dimension relative to the outer ground terminal 56 of the gauge rod. In positioning each gauge rod 53 in assembled relation in the micrometer, its frusto-conical surface 52 is moved into the frusto-conical bore 51 of the extension 40 until its inner terminal surface 55 engages the outer terminal surface 16' of the screw 16. Then the clamping nut 46 is rotated to thus move the fingers 50 of the clamping extension into rigid engagement with the frusto-conical surface 52 of the gauge rod 53, thereby securely locking the rod in the micrometer with its inner terminal in abutting engagement with the outer terminal 16' of the screw 16. In order to determine that the inner terminal 55 of the gauge rod 53 is in accurate abutting relation with the outer terminal 16' of the screw 16, a sight opening or aperture 57 extends through the enlarged head 41 of the barrel 31 so that the accurate engagement of the gauge rod terminal 55 with the terminal 16' of the screw 16 may be visually observed.

The gauge rods 53 provide extensions for one terminal of the micrometer, and, in order to provide related extensions for the opposed terminal of the micrometer, a plurality of extension members or tubes 60 are provided. The axial dimension of each extension tube 60 is related to the dimensions of the extension rods 53, as will be more fully explained hereinafter. Each extension tube 60 is preferably of cylindrical configuration, and the outer peripheral surface of each tubular extension is preferably approximately the same diameter as the outer peripheral surface of the micrometer thimble 10. Each extension member 60 is provided at one terminal with a reduced threaded boss or extension 62, thus defining an annular shoulder 63 between the boss 62 and the outer terminal of the body of the tubular member 60. The opposed terminal of each extension member 60 is provided with a threaded cylindrical aperture 64, and the threads of the aperture 64 are arranged to accurately receive the threads of the boss 62 formed at the opposed terminal of an adjacent tubular member 60, as will be more fully explained hereinafter. An annular shoulder or terminal surface 65 is formed at the terminal of each extension member or tube 60 between the outer peripheral surface 61 of the tube 60 and the threaded aperture 64. This annular shoulder 65 and the annular shoulder 63 formed at the opposed terminal of the tubular member 60 are accurately ground to provide a known accurate axial dimension therebetween. so that the effective length of each tube 60 is measured between the accurately ground shoulders 63 and 65. Each tubular extension 60 is preferably provided with a thermometer 66, of an approved construction, and the graduation 67 of this thermometer are observable through axially-extending radial apertures 68 formed in the wall of the tube 60. In order to lighten each tube 60 and to insure that there may be free circulation of atmospheric air within the tube 60, a plurality of apertures 70 extend through the wall of the tube to thus aid in maintaining the entire tube at uniform atmospheric temperature. The thermometer 66 is preferably cemented or otherwise secured in the axial bore 71 of the tube, as indicated at 72 in Figure 4 of the drawings.

In order that any preferred dimension within practical limits may be accurately determined or measured, the axial length of the micrometer body and the axial lengths of the gauge rods and tubular extension members are so related that the selected combination of these components can be employed to accurately determine the selected dimension. Although it is to be understood that any preferred dimension may be measured by this composite instrument, it is believed that a practical and commercially acceptable arrangement is one in which dimensions from 5 inches up to 145 inches may be accurately measured. To this end, the shortest gauge rod, indicated at the top of the group of rods depicted in Figure 1, has its opposed terminals accurately located and ground to provide a rod having an axial dimension of exactly 2 inches. When this rod is clamped in the micrometer, its inner terminal 55 abuts the accurately ground outer terminal 16' of the screw 16. Before inserting a gauge rod 53, the micrometer thimble 10 is adjusted so that it is positioned in zero relation to the micrometer barrel 32 as determined and indicated by the conventional micrometer scale. In this position one inch of the gauge rod is positioned within the micrometer terminal and one inch extends therebeyond, thus presenting with the micrometer a total axial dimension of five inches, the length of the micrometer being 4 inches. The micrometer and the extension gauge rod 53 are so proportioned that the total axial length of the micrometer and the shortest gauge rod in an atmospheric temperature of 70° F. and when the thimble is set at zero, will be exactly 5 inches. If for any reason the total axial length of the micrometer and the selected gauge rod 53 is not accurate, then the adjusting screw 23 may be manipulated so that the total axial length from the accurately ground outer terminal 56 of the gauge rod 53 to the accurately ground outer terminal of the adjusting screw 23 is exactly the required dimension. With this arrangement definite accuracy is assured, because the inner terminal 55 of the gauge rod 53 abuts directly against the outer terminal 16' of the screw 16, and the adjusting screw 23 is screwed in the cap 21 carried by the screw head 18, thus becoming, in effect, an integral component of the screw 16. It is seen that since the adjusting screw 23, in effect, becomes an integral part of the screw body 16, and, since the accurately ground terminal 16' of the screw 16 abuts the accurately ground inner terminal 55 of the gauge rod 53, that only two end to end abutting components are provided and located in the dimension-determining axis of the composite micrometer, thus insuring positive accuracy when the adjusting screw 23 is properly set, and, as before stated, it is preferable that the components be adjusted at an atmospheric temperature of 70° F. In order that the effective length of the composite micrometer may be determined at other temperatures, the operator is preferably provided with a scale indicating the length of the micrometer at the selected temperature, as will be more fully explained hereinafter. The micrometer screw and thimble moves relative to the barrel 31 throughout a range of 1 inch, thus making it possible to measure distances from 5 inches to 6 inches with the micrometer when the shortest gauge rod 53 is clamped thereto. The next shortest gauge rod has its axial length increased 1 inch, thus providing a rod having an axial length of 3 inches, and when this rod is clamped in the micrometer body, dimensions ranging from 6 inches to 7 inches may be accurately measured. The next rod has its dimension increased 1 inch to provide a rod 4 inches long, and, inasmuch as this rod extends 3 inches beyond the micrometer body the micrometer may be employed when this rod is clamped in position to measure dimensions ranging from 7 inches to 8 inches. The remaining two rods are each increased in length in increments of 1 inch so that when they are clamped in the micrometer dimensions ranging from 8 inches to 9 inches may be measured with one rod, and dimensions from 9 inches to 10 inches measured with the other. Thus it is manifest that by clamping the selected gauge rod 53 in the micrometer that any dimension ranging from 5 inches to 10 inches may be accurately measured. When it is desired to measure larger dimensions, a selected extension member or tube 60 is secured to the opposed terminal of the micrometer, thus extending the axial dimension of the micrometer to the desired dimension. In securing the selected tubular extension member 60 to the micrometer, the threaded axial extension 20 of the cap 21 is screwed from engagement with the axial threaded recess 19 of the enlarged head 18 of the screw 16. After the cap 21 has been removed, the threaded extension 62 of the selected tubular extension 60 is screwed into the threaded recess 19 until the accurately ground annular shoulder 63 of the tubular member 60 abuts the accurately ground annular shoulder 18' of the enlarged screw head 18. When the annular shoulder 63 engages the annular shoulder 18' with the desired pressure, this setting is indicated by the registration or alinement of the indicating mark or index 75 formed on the terminal of the tube 60 and a similar sight mark or index 76 formed at the outer terminal of the screw head 18. While extension member 60 of any preferred dimensions may be employed it has been found that a practical arrangement is one in which the shortest rod is 5 inches, thus presenting an axial dimension which is a multiple of the axial extension of the shortest gauge rod 53 beyond the terminal of the micrometer and also a multiple of the increment of increase of each gauge rod over its next shorter gauge rod, this increment of increase, as before stated, being 1 inch. It is preferred that the mechanic or user of the instrument be provided with a temperature chart, not shown, which indicates the length of any combination of components within a reasonable temperature range. At 70° F. the total axial length of the micrometer body is 4 inches and the length of the extension of the shortest gauge rod beyond the micrometer is 1 inch and the axial length of the shortest extension tube 60 is 5 inches. If the instrument is employed at different temperatures, then the effective length of any selected component or lengths of combinations of selected components is indicated by the chart, so that the user of the instrument may be guided thereby in accurately determining the required measurement. As before stated, any preferred combination of lengths of extension tubes having multiple relation to the increment of extension of the gauge rods over each other may be employed, but a preferred arrangement is one in which the shortest extension tube or member is 5 inches long, the next extension member 10 inches long, the next 15 inches, the next 35 inches, and the longest member 70 inches in effective length. If two or more extension tubes 60 are to be employed in axial alinement, then the threaded extension 62 of one tube is threaded into the threaded recess 64 of the next tube 60 until the annular shoulder 63 of the outermost tube 60 engages the annular shoulder 65 of the inner member 60, and the proper engagement of the shoulders 63 and 65 is indicated by registration or axial alinement of the index marks 75 formed on the outer peripheral surface of each tubular extension 60 at the opposed terminals thereof. By employing any selected combination of gauge rods 53 and extension tubes 60 in connection with the micrometer body, any desired dimension from 5 inches to 145 inches may be accurately measured, and this is made possible because the dimensions of the axial length of the extension members 60 bear such relation to the lengths of the gauge rods that the increment of increase of one gauge rod over the other forms a sub-multiple or aliquot part of the axial dimension of any one of the extension tubes or any combination of extension tubes, or, conversely, the axial dimension of any selected extension tube 60 or any combination of extension tubes presents a multiple of the increment of increase of the gauge rods over each other or the extension of the shortest gauge rod beyond the body of the micrometer. With this arrangement dimensional universality is afforded, so that any practical dimension may be accurately measured, and the accuracy of this measurement is assured by the end to end abutting relation of the selected gauge rod and micrometer screw and the shoulder to shoulder abutting relation of the extension tubes 60.

Inasmuch as the threaded cylindrical aperture 19 of the head 18 has the same diametrical dimensions as the threaded cylindrical aperture 64 of each extension member 60, the cap 21, after removal from the head 18, may if desired be secured to the outer terminal of the selected extension member 60 by simply screwing the threaded cap extension 20 into the threaded aperture 64 formed at the outer terminal of each extension member 60. If a single extension member 60 is employed, then the cap 21 is secured to its outer terminal, or if a plurality of connected extension members are employed, then the cap 21 is secured to the outer terminal of the outer extension member.

In the slightly modified form of my invention depicted in Figure 6, the screw 16a is provided with an axial bore 77 for the reception of a gauge rod 53a and also for the reception of a cylindrical extension 78 projecting axially from the threaded extension 20a of a cap 21a. The inner surface 80 of the inner or free terminal of the cap extension 78 is accurately ground to abut the inner terminal 55a of the gauge rod 53a. In this form of the invention the micrometer thimble 10a is adjusted to zero relation on the barrel 32a, and then the gauge rod is clamped in the hollow micrometer tube 16a with its accurately ground inner surface 55a abutting the accurately ground surface 80 of the cap extension 78. The adjusting screw 23 may be adjusted as hereinbefore described to provide an accurate overall dimension, and in cases in which the micrometer body is likely to engage a shallow recess which is being measured, the screw 23 may be lengthened in increments of ½ inch, as indicated in dotted lines at 23a in Figure 6. With such arrangement the outer terminal of the screw will reach to the desired surface, but, of course, the effective length of the micrometer is correspondingly increased.

In the form of my invention depicted in Figure 7, the barrel 32b has threads 36b formed in its outer peripheral surface which accurately engage threads 17b provided on the inner peripheral surface of the thimble 10b. In this form of the invention the cap 21a, similar to that disclosed in Figure 6, is employed, and the accurately ground inner surface 80 of its extension 78 abuts the gauge rod 53a in the manner depicted in the arrangement disclosed in Figure 6. This type micrometer is highly advantageous in instruments that are not so frequently used and in which the thimble can be threaded directly to the barrel without the employment of the usual threadwear compensating means. Preparatory to inserting the gauge rod 53a within the micrometer barrel 32b, the thimble 10b is set at zero position on the barrel 32b. In this position the gauge rod 53a is inserted until its inner terminal 55a abuts the accurately ground surface 80b of the cap extension 78, and, inasmuch as the axial length of the gauge rod 53a has been accurately determined, the overall axial length of the micrometer and its extension rod may be accurately determined. This type micrometer is preferably used in measuring relatively small work requiring axial dimensions ranging from 2 inches to 2½ inches, but, if this range is to be somewhat increased a plurality of gauge rods 53a may be provided and each rod is increased in axial dimension over the other in increments of ½ inch, as indicated at 53c in dotted lines in Figure 7.

In Figure 8 there is depicted an adjusting cap or head 81 having a threaded axial extension 82 which is received within the threaded cylindrical aperture 64 formed in one terminal of each extension tube 60. The outer terminal of each cap or head 81 is provided with a threaded cylindrical axial aperture 83 for the reception of the threaded extension 62 formed at one terminal of each extension tube 60. If after frequent use the joints between the cap and the adjacent extension tubes should become worn to thereby shorten the axial dimension of the assembled tubes, then this wear may be compensated for by positioning a thin washer or annular shim 85 between the outer annular shoulder 65 formed at one terminal of the extension tube 60 and a similar annular shoulder 86 formed in the cap 81. In assembling two or more extension tubes 60, the operator observes the register or index marks 75 inscribed on the peripheral surface of the tube 60 at the terminals thereof and a similar register mark or index 87 inscribed on the outer peripheral surface of each cap 81. If it is found that the register or index marks 75 and 87 are not located in axial alinement or registration, then it is apparent that the joint has become worn and a suitable shim 85 is positioned between the shoulders 65 and 86 to compensate for this wear.

Having thus described my invention, what I claim as new and useful is:

1. In combination, a micrometer including a barrel, a micrometer screw having an accurately located surface forming a terminal thereof, the micometer screw being threadedly secured relative to the barrel and located therein and having a predetermined range of adjusting movement, a gauge rod of given length having a predetermined ratio with respect to the range of movement of the screw, one terminal of the gauge rod adapted to engage the accurately located terminal surface of the screw, means for clamping the rod to the micrometer with the said rod terminal in abutting relation with the said screw terminal when the screw is in predetermined position relative to the barrel, a cap member secured to the micrometer screw, and an adjusting screw threadedly secured within the cap member and located in axial alinement with the micrometer screw and gauge rod so that the adjusting screw may be adjusted to accurately establish the effective length of the micrometer and gauge rod.

2. In combination, a micrometer including a barrel, a micrometer screw having an accurately located surface forming a terminal thereof, the micrometer screw being threadedly secured relative to the barrel and located therein and having a predetermined range of adjusting movement, a cylindrical thimble secured to the micrometer screw and surrounding the barrel, graduated indices provided on the barrel and thimble so that the degree of adjusting movement of the screw and thimble relative to the barrel may be determined by the relative positions of the said indices, a gauge rod of given length having a predetermined ratio with respect to the range of movement of the screw, one terminal of the gauge rod adapted to engage the accurately located terminal surface of the screw when the thimble and screw is located at a predetermined position in the barrel as determined by the indices, and means for clamping the rod to the micrometer barrel.

3. In combination, a micrometer including a barrel, a micrometer screw having an accurately located surface forming a terminal thereof, the screw being threadedly secured relative to the barrel whereby a predetermined range of adjusting movement of the screw relative to the barrel is provided, a gauge rod of length predetermined with respect to the range of adjusting movement of the screw, one terminal of the gauge rod adapted to engage the said accurately located terminal surface of the screw when the screw is in predetermined position relative to the barrel, and means for clamping the gauge rod to the micrometer.

4. In combination, a micrometer including a barrel, a micrometer screw having an accurately located surface forming a terminal thereof, the micrometer screw being threadedly secured relative to the barrel whereby a predetermined range of adjusting movement of the screw relative to the barrel is provided, a gauge rod having its length predetermined with respect to the range of adjusting movement of the screw, one terminal of the gauge rod adapted to engage the accurately located terminal surface of the screw when the screw is in predetermined position relative to the barrel, means for clamping the rod to the micrometer with the said terminal in abutting relation with the said screw terminal, and an adjusting screw threadedly secured to the terminal of the micrometer which is remote from the gauge rod and in axial alinement with the micrometer screw and gauge rod so that the adjusting screw may be adjusted axially to accurately determine the effective length of the micrometer and gauge rod.

5. In combination, a micrometer including a barrel, a tubular micrometer screw threadedly secured relative to the barrel whereby a predetermined range of adjusting movement of the screw relative to the barrel is provided, a cap member secured to the screw, an extension projecting axially from the cap member into the tubular screw and having an accurately located terminal surface, a gauge rod having opposed accurately located terminal surfaces and extending into the barrel and positioned within the tubular screw and having one of its accurately located terminal surfaces abutting the said accurately located terminal surface of the extension of the cap when the screw is in predetermined position relative to the barrel, the length of the gauge rod having a predetermined ratio with respect to the range of movement of the screw, and means for securing the gauge rod to the barrel with its accurately located surface in abutting engagement with the accurately located surface of the said cap extension.

6. A micrometer including a substantially cylindrical casing, an adjustable member having a predetermined range of adjusting movement axially within the casing, a gauge rod removably secured to one terminal of the casing and extending axially a predetermined distance therefrom, the length of the gauge rod being predetermined with respect to the range of adjusting movement of the adjustable member in such relation that the range of adjusting movement of the adjustable member is equal to or greater than the distance the gauge rod extends outwardly from the casing, and an extension member removably secured to the adjustable member at the opposed terminal of the casing and extending axially a predetermined distance therefrom, the length of the extension member being predetermined with respect to the range of adjusting movement of the adjustable member and also with respect to the axial distance the gauge rod extends outwardly from the casing.

7. A micrometer including a cylindrical casing, an adjustable member having a predetermined range of axial adjusting movement within the casing and having an accurately located terminal within the casing, a gauge rod removably secured to the casing and having an accurately located inner terminal abutted against the accurately located terminal of the adjustable member when the adjustable member is in predetermined axial position relative to the casing, the gauge rod extending axially outwardly a predetermined distance from the casing, this distance being predetermined with respect to the range of adjusting movement of the said adjustable member, the casing having a sight aperture formed therein through which the abutting terminals of the accurately located surfaces of the adjustable member and the gauge rod are visible.

8. In combination a micrometer including a barrel, an adjustable member having a predetermined range of adjusting movement axially of the barrel, an extension projecting axially from the adjustable member into the barrel and having an accurately located terminal surface, a gauge rod having opposed accurately located terminal surfaces and extending into the barrel and having one of its accurately located terminal surfaces abutting the said accurately located terminal surface of the said extension when the adjustable member is in predetermined position relative to the barrel, the length of the gauge rod having a predetermined ratio with respect to the range of adjusting movement of the adjustable member relative to the barrel, and means for securing the gauge rod within the barrel with its inner accurately located terminal surface in abutting engagement with the accurately located terminal surface of the said extension.

9. In combination, a micrometer including a barrel, a thimble surrounding the barrel and having a predetermined range of adjusting movement axially of the barrel, an extension projecting axially from the thimble into the barrel and having an accurately located terminal surface, a gauge rod having opposed accurately located terminal surfaces and extending into the barrel and having one of its accurately located terminal surfaces abutting the said accurately located terminal surface of the said extension when the thimble is in predetermined position relative to the barrel, the length of the gauge rod having a predetermined ratio with respect to the range of adjusting movement of the thimble relative to the barrel, and means for securing the gauge rod within the barrel with its inner accurately located terminal surface in abutting engagement with the accurately located terminal surface of the said extension.

10. A micrometer including a substantially cylindrical casing, an adjustable member having a predetermined range of adjusting movement axially within the casing, a gauge rod removably secured to one terminal of the casing and extending axially a predetermined distance therefrom, the length of the gauge rod being predetermined with respect to the range of adjusting movement of the adjustable member in such relation that the total range of adjusting movement of the adjustable member is equal to or forms an aliquot part of the distance the gauge rod extends axially outwardly from the casing, and an extension member removably secured to the adjustable member at the opposed terminal of the casing and extending axially a distance therefrom which is predetermined with respect to the range of adjusting movement of the adjustable member and also with respect to the axial distance the gauge rod extends outwardly from the casing, the length of the extension member being predetermined with respect to the range of adjusting movement of the adjustable member and also with respect to the axial distance the gauge rod extends outwardly from the casing.

11. A micrometer including a substantially cylindrical casing, an adjustable member having a predetermined range of adjusting movement axially of the casing, a gauge rod removably secured to one terminal of the casing and extending axially a predetermined distance therefrom, the length of the gauge rod being predetermined with respect to the range of adjusting movement of the adjustable member in such relation that the total range of adjusting movement of the adjustable member is equal to or forms an aliquot part of the distance the gauge rod extends axially outwardly from the casing, and a plurality of extension members removably secured in axial alinement to each other with the innermost extension member removably secured to the adjustable member at the other terminal of the casing in axial alinement with the gauge rod, the length of each extension member and the length of the said connected extension members being predetermined with respect to the range of adjusting movement of the adjustable member and also with respect to the axial distance the gauge rod extends outwardly from the casing.

WALTER E. SANFORD.